United States Patent
Zhao et al.

(10) Patent No.: US 10,216,654 B1
(45) Date of Patent: Feb. 26, 2019

(54) DATA SERVICE-AWARE INPUT/OUTPUT SCHEDULING

(71) Applicants: EMC Corporation, Hopkinton, MA (US); EMC IP Holding Company LLC, Hopkinton, MA (US)

(72) Inventors: Junping Zhao, Beijing (CN); Kenneth Durazzo, San Ramon, CA (US); Ricky Sun, Beijing (CN); Kevin Xu, Warren, NJ (US)

(73) Assignee: EMC IP Holding Company LLC, Hopkinton, MA (US)

( * ) Notice: Subject to any disclaimer, the term of this patent is extended or adjusted under 35 U.S.C. 154(b) by 248 days.

(21) Appl. No.: 15/218,239

(22) Filed: Jul. 25, 2016

(51) Int. Cl.
G06F 13/40 (2006.01)
G06F 13/16 (2006.01)
G06F 9/30 (2018.01)
G06F 9/38 (2018.01)

(52) U.S. Cl.
CPC ...... *G06F 13/1642* (2013.01); *G06F 9/30087* (2013.01); *G06F 9/3816* (2013.01); *G06F 13/4059* (2013.01); *G06F 13/161* (2013.01)

(58) Field of Classification Search
CPC ...... G06F 9/505; G06F 9/4881; G06F 9/5083; G06F 9/4843; G06F 13/4059; G06F 13/161; G06F 13/404; G06F 9/3816; G06F 9/30087
See application file for complete search history.

(56) References Cited

U.S. PATENT DOCUMENTS

| | | | | |
|---|---|---|---|---|
| 9,032,162 B1* | 5/2015 | Chang | .................. | G06F 13/161 711/149 |
| 2003/0195920 A1* | 10/2003 | Brenner | ................ | G06F 9/4881 718/107 |
| 2009/0313402 A1* | 12/2009 | Nara | .................. | G06F 13/4059 710/52 |

OTHER PUBLICATIONS

P. Mell et al., "The NIST Definition of Cloud Computing," U.S. Department of Commerce, Computer Security Division, National Institute of Standards and Technology, Special Publication 800-145, Sep. 2011, 7 pages.

* cited by examiner

*Primary Examiner* — Ernest Unelus
(74) *Attorney, Agent, or Firm* — Ryan, Mason & Lewis, LLP

(57) ABSTRACT

A method of request scheduling in a computing environment comprises the following steps. One or more requests to at least one of read data from and write data to one or more storage devices in the computing environment are obtained from a host device. The one or more requests are aligned corresponding to a segment size for which one or more data services in the computing environment are configured to process data. The one or more aligned requests are dispatched to the one or more data services prior to sending the one or more requests to the one or more storage devices.

20 Claims, 10 Drawing Sheets

```
struct queue_limits { // param structure for a request_queue
    ...
    unsigned int    physical_block_size;
    unsigned int    alignment_offset;          //it's for partition alignment
    unsigned int    preferred_segment_len;     //may define a new field
    unsigned int    io_opt;                    //or may override this for optimal_io_size
    unsigned int    segment_cnt_to_dispatch;   // large enough request so
skip further merge and just dispatch to dedup/compression
    unsigned char   submit_policy;             //local, global, part
    unsigned int    submit_timeout;            //to guaranteed latency
    ...
};
```

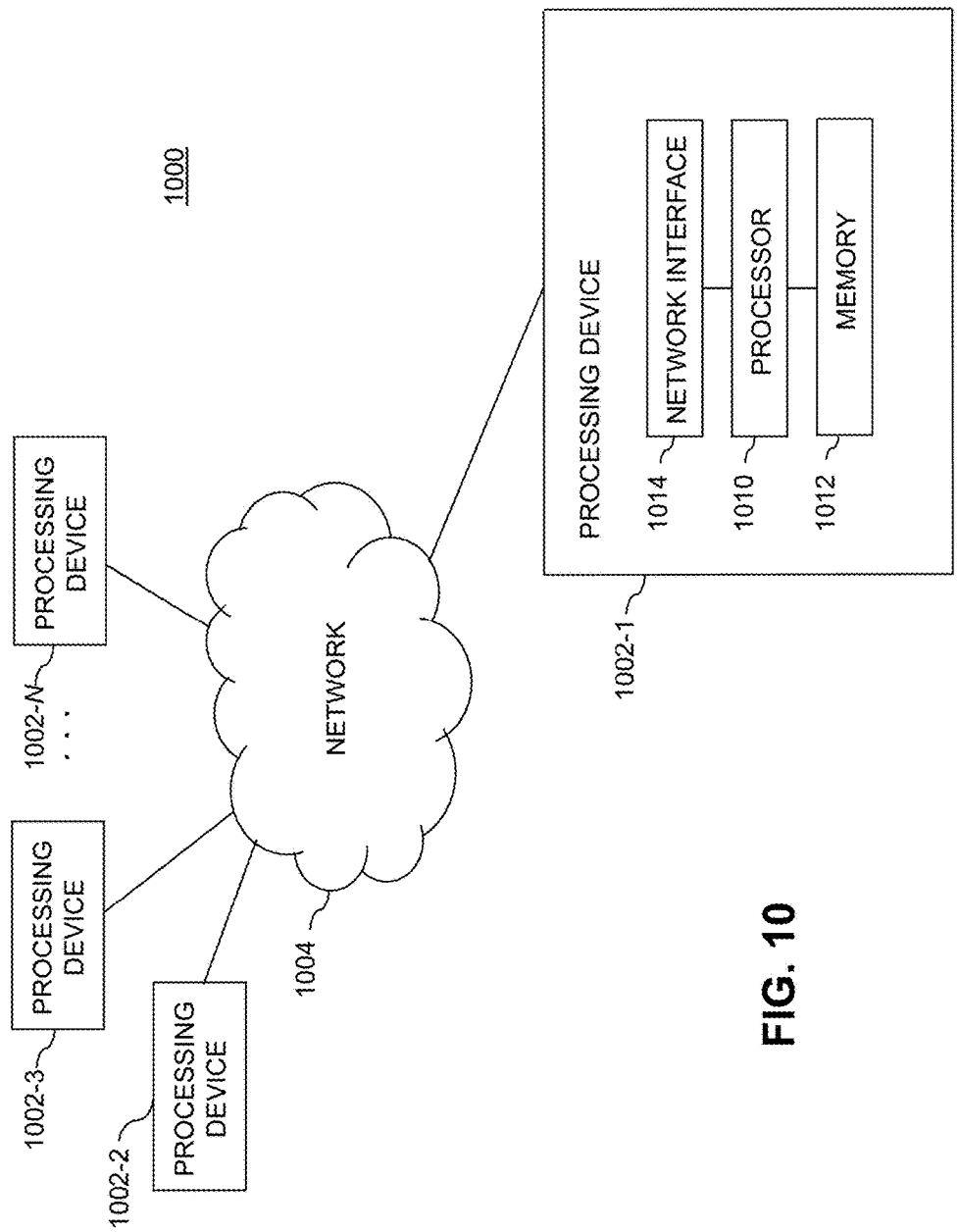

DATA SERVICE-AWARE INPUT/OUTPUT SCHEDULING

FIELD

The field relates generally to computing environments, and more particularly to scheduling of data input/output requests in such computing environments.

BACKGROUND

Computing environments, such as data centers, frequently employ cloud computing platforms, where "cloud" refers to a collective computing infrastructure that implements a cloud computing paradigm. For example, as per the National Institute of Standards and Technology, cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction. Cloud-based data centers are deployed and managed by cloud service providers, who provide a computing environment for customers (tenants) to run their application programs (e.g. business applications or otherwise). The applications are typically run on one or more computing devices (i.e., host devices or hosts), and write data to and read data from one or more storage devices (e.g., hard disk drives, flash drives, etc.). The storage devices may be remote from the host devices such that they are connected via a communication network. However, some or all of the storage devices may be part of the same computing devices that implement the hosts.

Scheduling of the read and write requests, or input/output (TO) requests as they are also called, from the applications to the storage devices is managed by a software component known as an IO scheduler (also called a system IO scheduler). An IO scheduler does not typically issue requests to the storage devices in the order they are received or as soon as they are received from the applications. To do so would be highly inefficient since disk seeks (searching the disk for the memory location corresponding to the IO request) are considered time consuming and directly impact system throughput performance.

Thus, IO schedulers perform merging and sorting operations on pending IO requests. Merging is the coalescing of two or more requests into one by inserting a new request in a request queue such that the new request is issued along with an existing request in the queue. This is typically done, for example, when the two requests are being made to adjacent disk sectors. On the other hand, sorting is the organization of requests in the request queue based on sectors so that seeking operations along the request queue move, when possible, sequentially over the sectors of the disk. While most IO schedulers (e.g., Linux IO scheduler, deadline IO scheduler, complete fair queuing (CFQ) IO scheduler, Noop IO scheduler, etc.) perform some type of merging, sorting is not typically necessary when the storage device is a random access storage device (e.g., flash drive) and therefore sequential movement across the disk is not needed (e.g., the Noop IO scheduler performs only merging).

SUMMARY

Embodiments of the invention provide techniques for improved IO scheduling in computing environments.

For example, in one embodiment, a method of request scheduling in a computing environment comprises the following steps. One or more requests to at least one of read data from and write data to one or more storage devices in the computing environment are obtained from a host device. The one or more requests are aligned corresponding to a segment size for which one or more data services in the computing environment are configured to process data. The one or more aligned requests are dispatched to the one or more data services prior to sending the one or more requests to the one or more storage devices.

These and other features and advantages of the invention will become more readily apparent from the accompanying drawings and the following detailed description.

BRIEF DESCRIPTION OF THE DRAWINGS

FIG. 6 illustrates an implementation of a data service segment-size parameter specification mechanism for use with a data service-aware input/output scheduler, according to an embodiment of the invention.

FIG. 10 illustrates a processing platform used to implement a computing environment with a data service-aware input/output scheduler, according to an embodiment of the invention.

DETAILED DESCRIPTION

Figure 1:
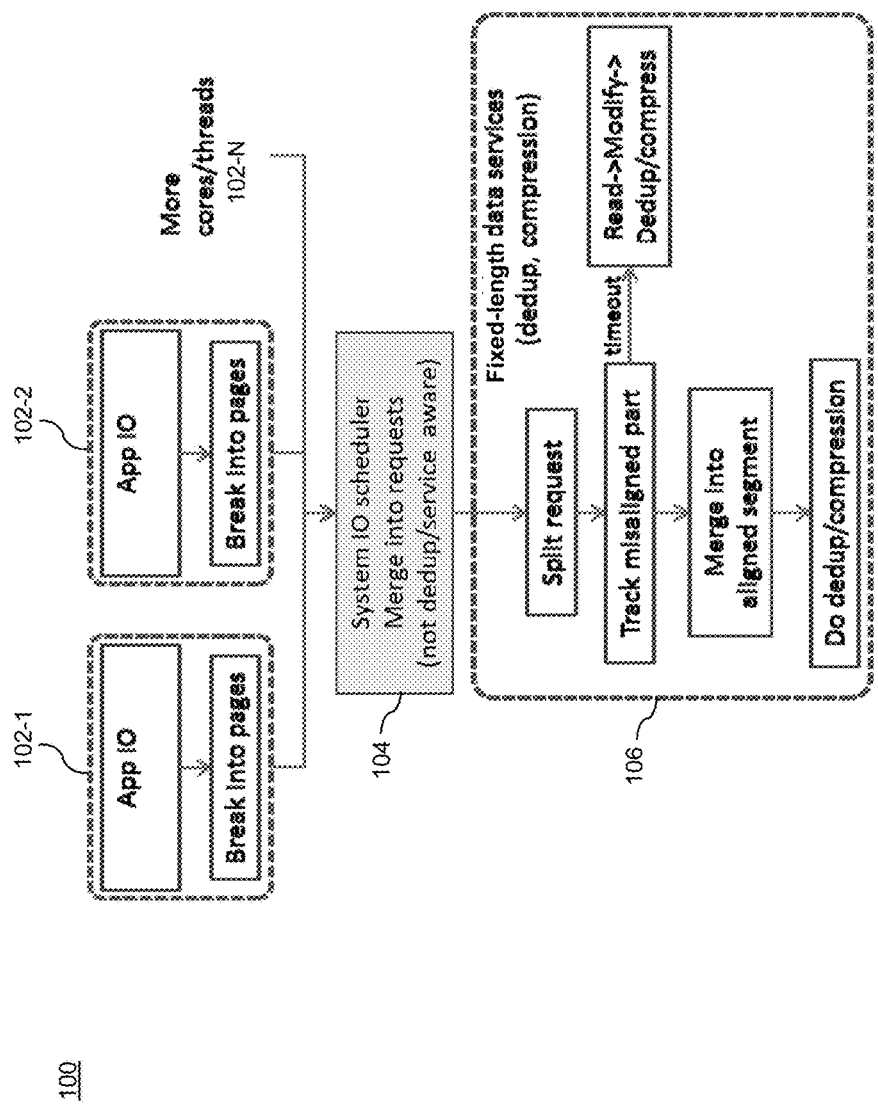
FIG. 1 illustrates misaligned requests associated with a data service-unaware input/output scheduler in a computing environment, according to an embodiment of the invention.

Illustrative embodiments may be described herein with reference to exemplary cloud infrastructure, data repositories, data centers, data processing systems, computing systems, data storage systems and associated servers, computers, storage units and devices and other processing and computing devices. It is to be appreciated, however, that embodiments of the invention are not restricted to use with the particular illustrative system and device configurations shown. Moreover, the phrases "cloud environment," "cloud computing platform," "cloud infrastructure," "data repository," "data center," "data processing system," "computing system," "data storage system," "computing environment," and the like as used herein are intended to be broadly construed, so as to encompass, for example, private and/or public cloud computing or storage systems, as well as other types of systems comprising distributed virtual infrastructure. However, a given embodiment may more generally comprise any arrangement of one or more processing devices.

It is realized herein that the use of data services, such as, for example, data deduplication, data compression, checksum, etc., in conjunction with computing environments, such as, for example, the application host computing environment mentioned above, has become prevalent.

Data deduplication (or dedup as it is known in short) is a data service that segments an incoming data stream, uniquely identifies data segments, and then compares the segments to previously stored data. If the segment is unique, it is stored on disk. However, if an incoming data segment is a duplicate of what has already been stored, a reference is created to it and the segment is not stored again. For example, a file or volume that is backed up every week creates a significant amount of duplicate data. A data deduplication service analyzes the data and stores only the unique segments of a file. This process can provide an average of 10 to 30 times reduction in storage capacity requirements, with average backup retention policies on normal enterprise data. This means that companies can store 10 TB to 30 TB of backup data on 1 TB of physical disk capacity, which has huge economic benefits.

In conjunction with the data deduplication service, data compression is a data service that is used to compress the unique segments of a file before they are stored on disk. Data compression in a block-based storage system reduces the size of data on disk, typically increasing available capacity up to about 50 percent. Compression can typically be enabled automatically and operates in the background to avoid performance degradation.

More particularly, inline deduplication and/or compression are prevalent today especially for flash device or networking IO. An inline data service is a data service that is performed on data before or as it is being written to a storage device. For performance and efficiency purposes, incoming data usually are merged (and possibly sorted) into a request by the IO scheduler, as explained above. Typically, deduplication and compression services are designed with the same segment granularity such as 8 kilobytes (KB), 32 KB, etc. That is, the deduplication service and compression service are configured to both operate on the same segment size. However, it is realized herein that widely-used IO schedulers are completely unaware of such a data segment size requirement from underlying data services. As a result, it is realized herein that request misalignment between the IO scheduler and the data services is drastic and causes significant unnecessary processing overhead, as will be further illustrated below. In a computing environment with host devices comprising multiple threads and multiple cores, about 80% of requests can suffer from such misalignment.

One way to resolve such significant request misalignment is to completely replace the data service-unaware IO scheduler with some newly designed scheduler running in userspace. While this approach is workable, it requires considerable effort. However, in some cases, it is non-workable. For example, deduplication and compression may run at the customer site through a client or an agent. As such, it may not be easy or even possible to modify the application IO stack of the customer.

Thus, it is realized herein that the start address and length of the request should align with the underlying data services such as fixed-size (fixed-length) deduplication and compression so that such data reduction processes operate at optimal performance. Accordingly, illustrative embodiments provide a data service-aware IO scheduler and methodologies that achieve improved end-to-end (e.g., host-to-storage) performance via request alignment and optimization (such as for multi-core, multi-thread host environments), while still preserving fairness with respect to request scheduling. It is to be appreciated that the data service-aware techniques described herein can also be applied to existing IO schedulers to improve performance.

Before describing further details of a data service-aware IO scheduler and methodology according to illustrative embodiments, request misalignment in the context of data service-unaware IO schedulers will be explained.

Figure 2:
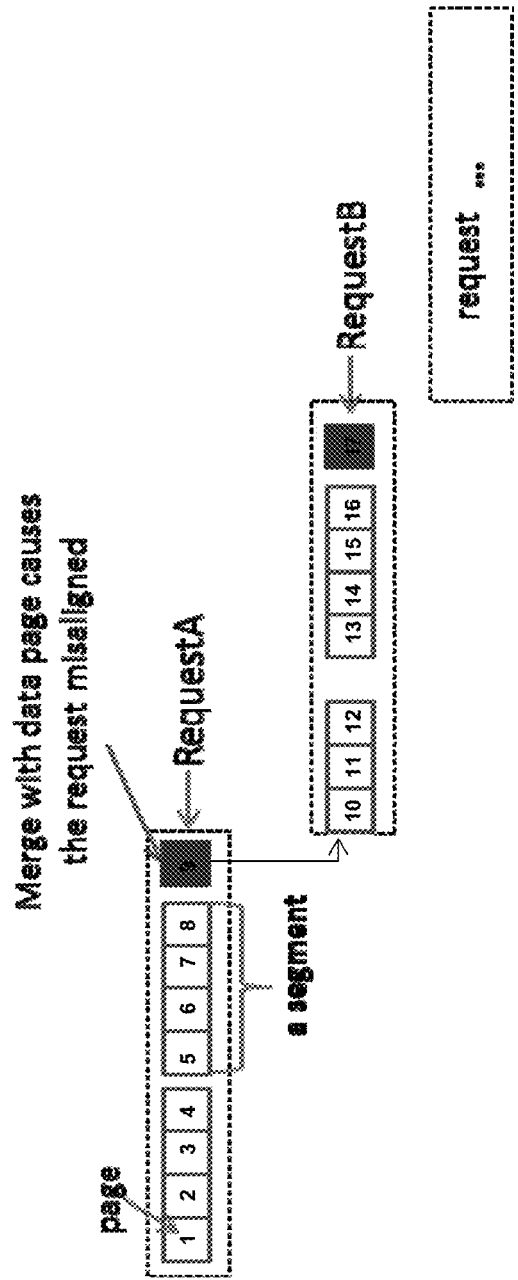
FIG. 2 further illustrates misaligned requests associated with a data service-unaware input/output scheduler in a computing environment, according to an embodiment of the invention.

More particularly, FIGS. 1 and 2 illustrate misaligned requests associated with a data service-unaware input/output scheduler in a computing environment.

As shown in FIG. 1, multiple cores/threads 102-1, 102-2, . . . , 102-N respectively execute multiple applications that each generate application IO requests (data write requests and data read requests). A core is one processing unit of multiple processing units within a multi-core processor device (multi-core central processing unit (CPU) chip) of a host device. Each core may execute a sequence of program code called a thread, and the operating system interleaves execution of the multiple active threads of the multiple cores via a process called hyper-threading or multi-threading.

For a write request, assume that each core/thread breaks the data to be written to the storage devices into multiple data pages. IO scheduler 104 receives the data pages from the applications. The IO scheduler 104 merges some number of data pages into a request using a typical merging algorithm. Prior to being sent to the storage devices for storage, assume that a data deduplication process (and possibly a data compression process) is applied to the data. Since IO scheduler 104 is not sensitive to the specific data block boundaries for which the data deduplication and data compression processes are configured (i.e., the scheduler is data service-unaware), the IO scheduler 104 merges the data pages from the applications into a request length for which it (the scheduler) is programmed to create, which is not necessarily the length that the data services (deduplication and compression) are configured to process.

This is further illustrated in example 200 shown in FIG. 2. Assume that data service-unaware IO scheduler 104 issues a request (after a merge operation) that includes 9 data pages (pages 1, 2, 3, . . . , 9), i.e., Request A, to a deduplication service that is configured to process segments of a fixed length of 4 data pages. Assume further that the next request, Request B, contains the next 8 data pages (pages 10, 11, 12, . . . , 17) following the 9 data pages of Request A. Still further, assume that the pages that the IO scheduler 104 is sending via subsequent requests (Request A, Request B, etc.) comprise sequentially contiguous data pages (although this is not necessarily required but only used for this illustrative explanation). The deduplication service could take the first 8 data pages of Request A and process them as two 4 data page segments, but the remaining data page (page 9) causes misalignment since the other three data pages that should go with the last data page in Request A are the first three data pages (pages 10, 11 and 12) of Request B (illustrated by the arrow connecting the data pages between requests). While Request B is 8 data pages in length (pages 10, 11, 12, . . . , 17) and could be broken into two 4 data page segments, the data pages of each segment would be misaligned.

Thus, returning to FIG. 1, the steps of process 106 could be performed to address the misalignment described above in the context of FIG. 2. The misaligned request (e.g., Request A in FIG. 2) is split. Then, the misaligned part (data page 9) is tracked. Process 106 waits for the next request (e.g., Request B) and times out if a predetermined time period elapses before the next request is received. Assuming there is no timeout and the next sequential request comes in with the contiguous data pages (pages 10, 11 and 12) corresponding to the misaligned part (data page 9), process 106 merges the data pages (data pages 9, 10, 11 and 12) into an aligned segment, and deduplication is applied to the segment along with the other segments.

If however there is a timeout, the data service can take an optimistic approach where it waits again for another predetermined time period, or it can take a pessimistic approach. In the pessimistic approach, the data service does not expect the missing part will be coming, and thus considers the request as a partial write and follows a read-modify-compress routine. Such a routine is simple but at a high cost in extra disk IO and processing. In comparison, note how the optimistic approach assumes the missing block will be coming shortly and deserves another wait (such as adding the request into a separate pending list), then combines the pages into a full segment and resumes deduplication/compression. Note also that the worst case scenario is that the data service falls back to a read-modify-flush routine after a timeout. Clearly, the original request is blocked unless all derived requests are processed, so this may become the slowest path and a significant bottleneck. Essentially, in this example of process 106, the data service runs another "scheduler," making the system expend double-effort just because the default system IO scheduler is not aware of the data service data boundary requirements.

Furthermore, even an application that happens to issue aligned IO (by setting block size, for example, as 32 KB or 64 KB, etc.), after the IO scheduler performs merging (and possibly sorting), a significant percentage of the IO requests still suffer misaligned. As a result, fixed-size block compression/deduplication modules have to expend considerable effort (i.e., processing overhead) to split requests and re-merge them.

In reality, for performance reasons, many modern "third platform" applications and some traditional enterprise applications set their recommended block size large enough (and as a multiple of the system page size). For example, Exchange 2013/2016 recommends 64 KB, SQL Server recommends 32 KB or 64 KB; SAP HANA recommends a save point size greater than or equal to 64 KB, VMFS6 is 1 MB, and Hadoop is 64 MB. As such, data deduplication/compression granularity is better aligned with such application block sizes. However, the system kernel still breaks data from these applications into pages (such as 4 KB pages) and submits the pages to the IO scheduler for merge and sort operations (as illustrated above in the context of FIGS. 1 and 2).

Thus, it is realized herein that current widely-used IO schedulers are designed for maximum throughput and enough fairness, but are not sensitive to the special block boundary which is critical for underlying data services such as fixed-size deduplication, compression, checksum etc. Thus, while such data service-unaware IO schedulers try to merge as many data blocks as possible (typically up to 1 MB), even one extra sector may break the deduplication/compression segment boundary and impact all the subsequent deduplication/compression operations.

Such a problem is made even worse with multiple cores or multiple (user/kernel) threads. For example, assume that many cores are submitting write IOs concurrently. Coordination of blocks segmenting in those cores or between cores with the least contention (due to locking) and adequate merge and sort operations for sufficient throughput is a daunting task, and thus adds to the above-mentioned problems of the data service-unaware IO scheduler.

Furthermore, considering that blocks are continuously merged, uncertainty occurs in practice with regard to when to perform "cut-off" or stop merging. Applying cut-off too early would degrade throughput since blocks are not sufficiently aggregated; or otherwise the system may get a large enough request with a misaligned "tail" as no further block is coming. Accordingly, what is needed is a reasonable approach to balance throughput, latency and alignment. Illustrative embodiments, as will be further described below in the context of FIGS. 3-10, provide such a reasonable approach.

As will be further explained in detail, illustrative embodiments provide an approach to enable system IO schedulers to be aware of underlying data services' segment requirements, and then perform segment-aware data block merge/sort and scheduling especially in multi-core/thread. Such illustrative embodiments work on existing widely used system IO schedulers such as, but not limited to, a Linux IO scheduler, a deadline IO scheduler, a CFQ IO scheduler, a Noop IO scheduler, etc.

Figure 3:
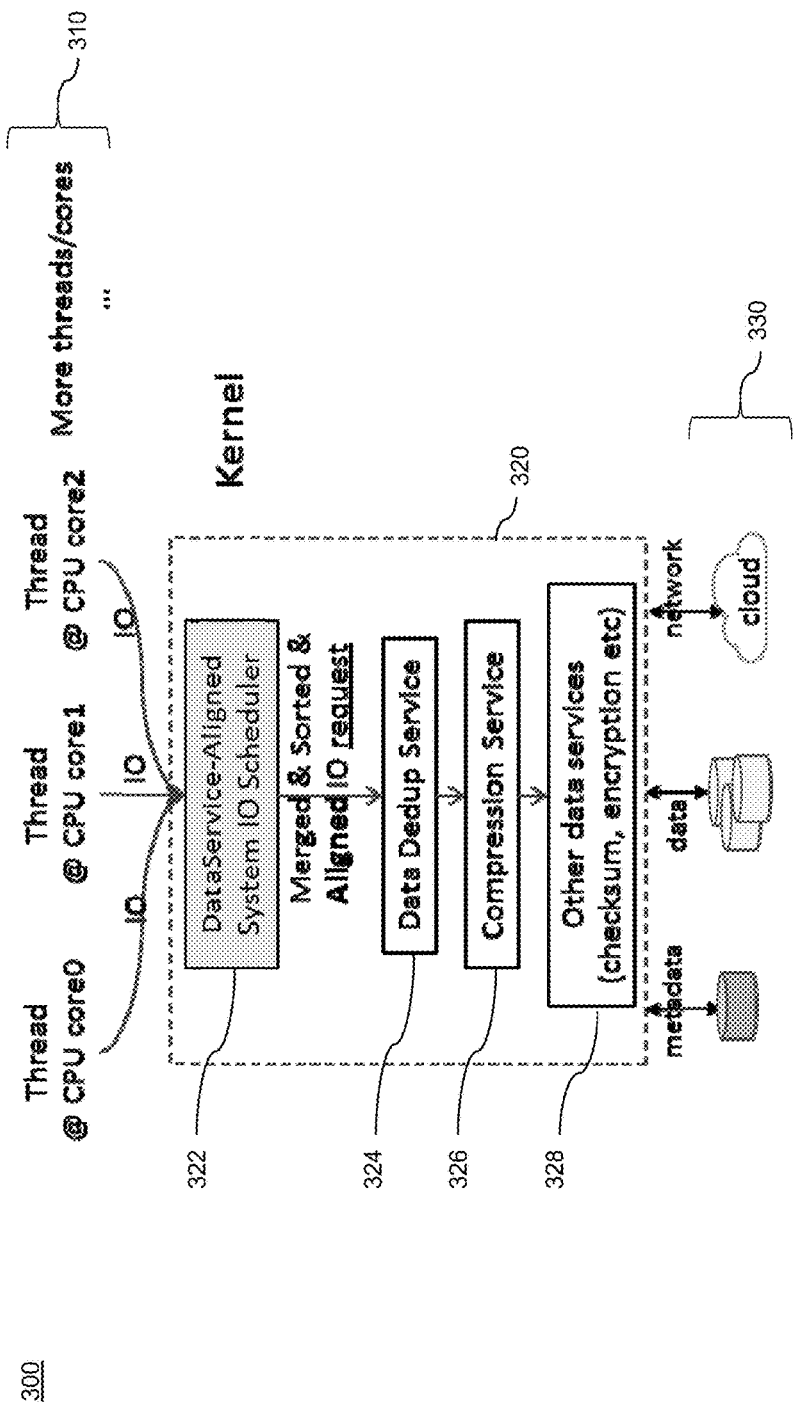
FIG. 3 illustrates a computing environment with a data service-aware input/output scheduler, according to an embodiment of the invention.

FIG. 3 illustrates a computing environment 300 with a data service-aware input/output scheduler, according to an embodiment of the invention. More specifically, as shown, computing environment 300 comprises a plurality of cores/threads collectively referenced as 310. The cores/threads 310 may be part of a host device (host), as mentioned above. The cores/threads 310 generate a plurality of IO requests that are provided to kernel 320. As shown, kernel 320 implements data service-aware IO scheduler 322 and data services 324, 326, and 328. IO scheduler 322 is configured to be aware, as will be explained in further detail below, of the underlying segment requirements of data services 324, 326, and 328 so that the scheduler performs segment-aware data block merge/sort and aligned scheduling for the IO requests generated by cores/threads 310. Thus, the request misalignment problem discussed above in the context of FIGS. 1 and 2 is overcome.

As illustratively shown, data services include, but are not limited to, data deduplication service 324, data compression service 324, and other data services 328 (e.g., checksum, encryption, etc.). Following application of the one or more data services, the IO requests are sent from the kernel 320 to the one or more storage devices collectively referenced as 330. For example, as shown, the IO requests may be directed to storage devices that store metadata and/or data, and may be directed to one or more storage devices located in a cloud platform operatively coupled to the kernel 320 by a communication network.

Figure 4:
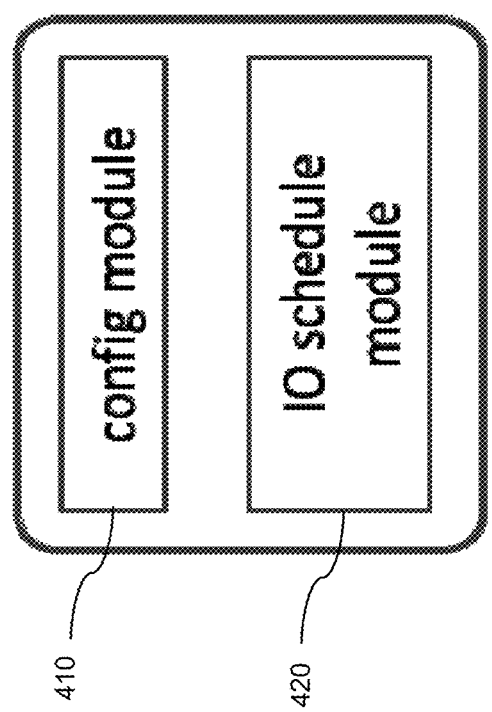
FIG. 4 illustrates a modular architecture for data service-aware input/output scheduling, according to an embodiment of the invention.

FIG. 4 illustrates a modular architecture 400 for implementing data service-aware IO scheduling according to an illustrative embodiment. In the illustrative embodiment, there are two main functional modules: configuration (or config for short) module 410; and enhanced IO schedule module 420.

Configuration module 410 enables parameter setting, on a per device basis, by the one or more data services. A per device basis here means on a per host device basis. The configuration module 410 runs on the same host which is the configuration target machine, and internally the module comprises: 1) a user space component that exports a local or remote access or configuration interface, i.e., through CLI, Web/Http, RESTful API, etc., and handles configuration requests; and 2) a system call API that gets/sets kernel scheduler related parameters.

Enhanced schedule module 420 optimizes data merge/sort and scheduling in a segment-aware manner. The architecture employs a two-phase methodology (local queue→global queue for a multi-core/thread environment), as will be further explained below.

Figure 5:
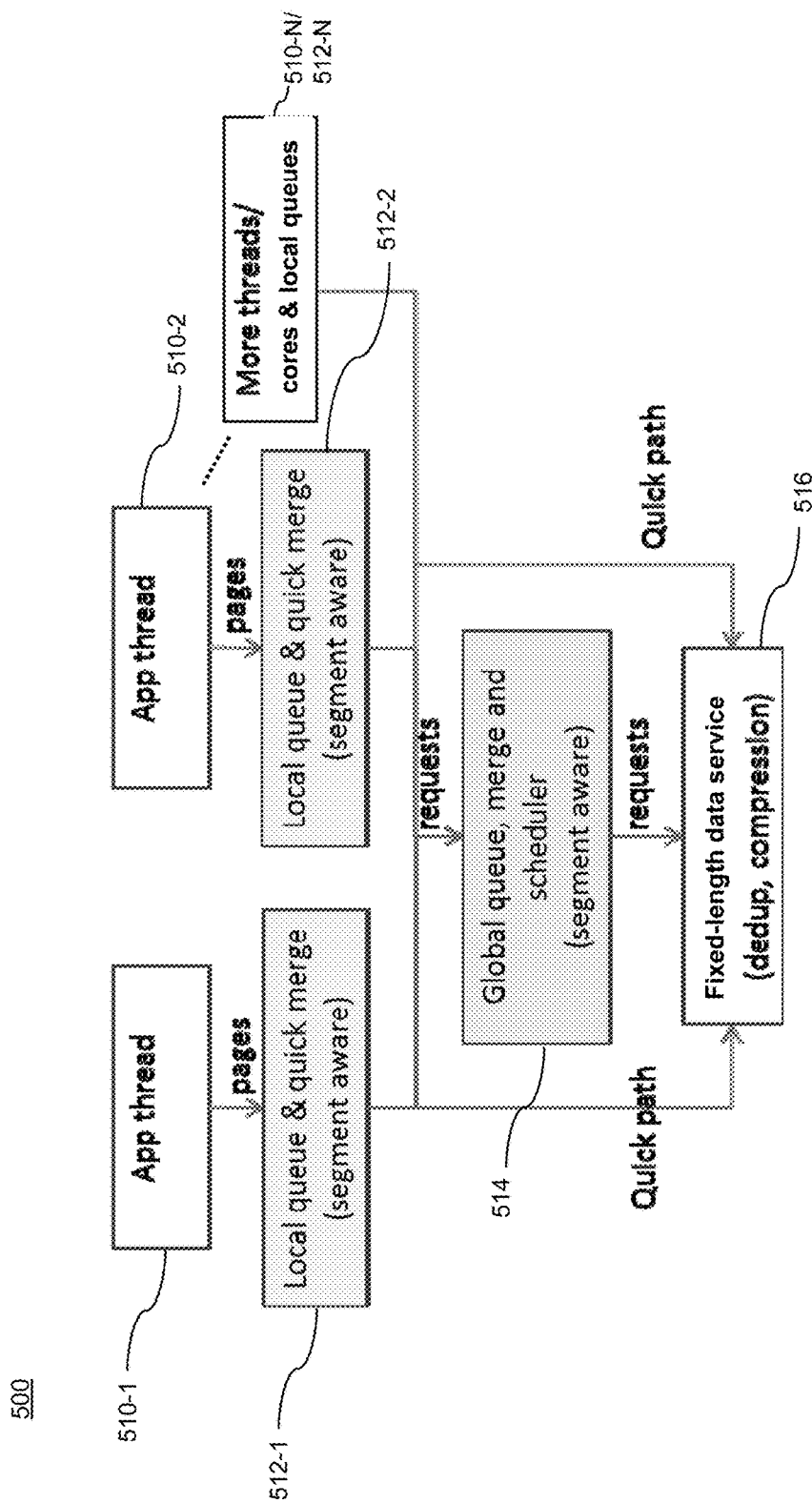
FIG. 5 further illustrates a computing environment with a data service-aware input/output scheduler, according to an embodiment of the invention.

FIG. 5 illustrates a computing environment 500 with a data service-aware input/output scheduler that implements the above-mentioned two-phase methodology, according to an embodiment of the invention. As will be further explained, the preferred segment size of the underlying data service is specified to the request queue of the IO scheduler. This can be accomplished, for example, in a Linux implementation, either through specification of a new field such as "service_preferred_segment" in request_queue.queue_limits. "Request_queue" is the current Linux structure that commonly manages a set of parameters, status, and statistics for a specific block device. "Queue_limit" is a sub-set of parameters within request_queue, which maintains block device configurable (soft) or un-configurable (hard) properties. Specification of the preferred segment size can also be done during service initialization (re-using existing queue configuration routine). As explained above, the IO scheduler works on a request queue, so with knowledge of the preferred segment size of the underlying data service(s), the IO scheduler becomes able to execute optimizations proposed herein.

Depending on service capability, different devices may have different preferred segment sizes. For instance, assume compression granularity on a first storage volume, Vol1, is 8 KB (i.e. for online transaction processing (OLTP) workload), while it may be 64 KB on a second storage volume, Vol2 (for online analytical processing (OLAP), P3, or a batch processing application).

Proper handling of concurrent incoming requests from multiple cores/threads is important for performance. Thus, illustrative embodiments provide an approach to exploit multi-core capabilities and to reduce potential contentions (such as locking issue in non-uniform memory access (NUMA) scenarios).

As shown in FIG. 5, in a host device, each application core/thread 510-1, 510-2, . . . , 510-N is assigned its own local queue 512-1, 512-2, . . . , 512-N, while a global queue 514 is maintained on a per host device basis. Thus, it is to be understood that while FIG. 5 shows one global queue, the IO scheduler may maintain multiple global queues corresponding to multiple host devices (each having multiple cores/threads). The IO scheduler (local queues and global queue) is coupled to fixed-length data service 516 (e.g., data deduplication, data compression, etc.).

Accordingly, IO requests are handled in a two-phase (local queue→global queue) methodology as follows. There is a per core (local) queue structure 512 and a per device (global) queue structure 514. Both the local and global queues merge/sort operations are segment-aware. Each local queue 512 is fast without contention locking to absorb and merges quickly before submitting the IO request to the global queue 514. The shared global queue acts as a global staging phase and runs more complex merge/sort operations on requests across cores.

As further shown in FIG. 5, the term "quick path" refers to the scenario when the IO request that is received at the local queue happens to already be aligned to the preferred segment size of the data service and of the appropriate size. In such case, the request can go directly to the data service 516.

During merging and scheduling, metrics are fully tracked and considered including, but not limited to, throughput, latency and alignment. Thus, illustrative embodiments enable balanced optimization during local merge and global merge, and configurable policies to accommodate various scenarios.

In an illustrative embodiment, the data service-aware IO scheduler works on the IO request queue per device. As explained above, a configurable parameter is set by the underlying data service to notify the queue/scheduler about its preferred segment size, e.g., such as 8 KB or 32 KB. Then, the IO scheduler attempts to optimally align such segment setting during operation. Thus, the final dispatched request length is a multiple of a segment. In one illustrative embodiment, the parameter can be a new file such as "preferred_segment_length" (in sectors) and a relevant running policy to expose application programming interfaces (APIs) to get ( ) and set ( ) FIG. 6 is an example of a preferred segment-size parameter specification mechanism 600 for a Linux implementation. Explanations of the main functions of mechanism 600 are as follows:

preferred_segment_len: data service preferred block segment length, set by data service during initialization, such as deduplication/compression may run at 4 KB (or 8 KB or 32 KB, etc.), and thus sets corresponding value.

submit_policy: configurable strategy about IO segment merge and submit, such as could be set as "local" (always merge IO segment at local CPU at first), "global" (skip local merge and submit to global merge queue) or "partial" (split the request, submit the aligned part to global queue and leave the remaining misaligned part at local for continuing merge). See the handling routine shown in FIG. 9.

submit_timeout: a configurable threshold relating to merge timeout (such as, e.g., in milliseconds) that an in-progress segment would be submitted for sure after this timeout no matter whether it is aligned or not, to provide the guaranteed processing latency.

segment_cnt_to_dispatch: a configurable threshold relating to segment length, e.g., if segment exceeds this length (i.e., large enough or of sufficient size), it may be exempt from any merge and go to data service directly.

As an illustrative implementation, the above new parameters could be organized into some existing data structure such as "queue_limits" which is the commonly used data structure to describe a block device configurable or un-configurable properties (or more specifically, queue_limits is part of another common data structure "request_queue"), such as:

struct queue_limits {
. . .
unsigned int preferred_segment_len;
char submit_policy;
int submit_timeout;
int segment_cnt_to_dispatch;
. . .
}

With parameter preferred_segment_len, the IO scheduler becomes aware of the best fit segment size (such as 8 KB or 32 KB, assume 32 KB for example) of the data service(s), and the IO scheduler is thus improved to merge data blocks into such segment alignment such as, for example, 32 KB*N). In an extreme case, the IO scheduler may abort continuous merge if it causes misalignment and the current request is fully aligned and large enough.

Figure 7:
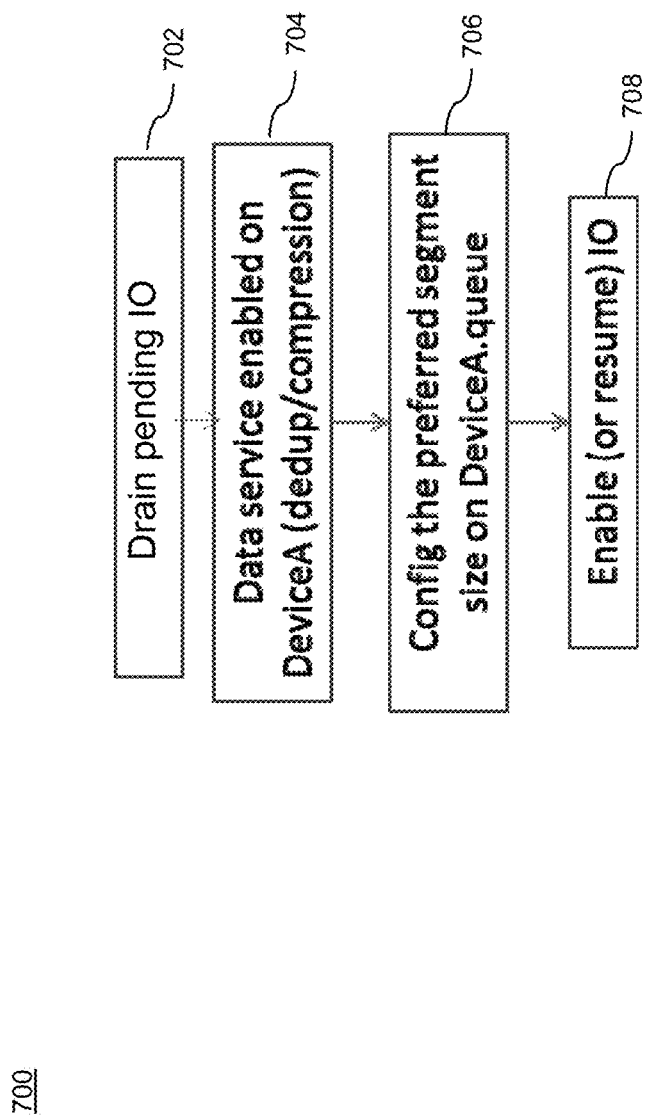
FIG. 7 illustrates a segment configuration methodology for a data service-aware input/output scheduler, according to an embodiment of the invention.

FIG. 7 illustrates a segment configuration methodology for a data service-aware input/output scheduler, according to an embodiment of the invention. As shown in methodology 700, step 702 drains pending IO, if so desired. Draining pending IO operates as follows (although it is an option that can be used or not). When a user issues the command to enable a data service (deduplication, compression, etc.), if there is in-progress IO happening but not completed at that moment, typically the data service shall wait until those IO are completed, then enable data service. Such "wait" or "drain pending IO" is to ensure the data service is on/off in an atomic-like fashion.

Step 704 enables a data service (e.g., deduplication, compression, etc.) on a given device (e.g., device A). Step 706 configures the preferred segment size for the enabled data service on the request queue for the given device. Then, in step 708, IO requests are enabled (or resumed).

Figure 8:
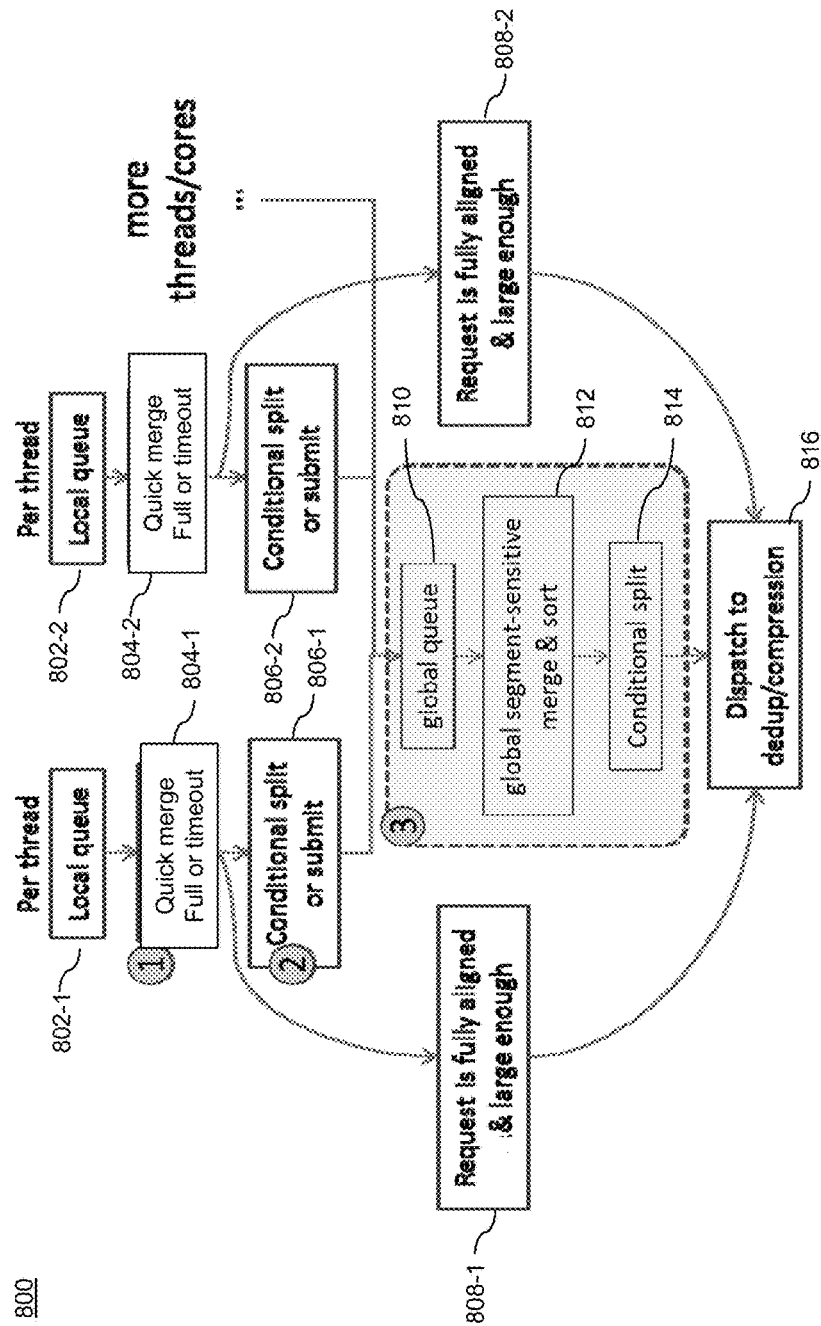
FIG. 8 further illustrates a two-phase data service-aware input/output scheduling methodology, according to an embodiment of the invention.

FIG. 8 further illustrates the two-phase data service-aware input/output scheduling methodology, according to an embodiment of the invention. To fully exploit multi-core and concurrent handling, illustrative embodiments implement two phase (local→global) segment-aware merge/sort and scheduling, and then dispatch requests to the data services. At each phase, alignment is checked before transiting to next phase. Methodology 800 further depicts the following steps (note that the numbers below correspond to the numbers shown in FIG. 8):

1. Each application thread has a local queue (e.g., 802-1, 802-2) for its private submitted data set (read or write) that performs quick data merge (e.g., 804-1, 804-2), based on startAdd and length per device, which is fast without locking and consecutive blocks are combined into a larger request.

2. When the local queue gets full (e.g., up to 16 requests) or times-out (e.g., 1 second, which is configurable), requests in the local queue are submitted to the global queue. Upon submit (e.g., 806-1, 806-2), the methodology checks the alignment situation and takes actions to avoid misalignment. Note that requests that are fully aligned and large enough (e.g., 808-1, 808-2) are sent from the local queue directly to data service.

3. The global queue (810) runs more comprehensive merge/sort (which is configurable, and may re-use deadline scheduling or Noop scheduling, etc.) including merging multiple requests (812). Optionally, the global queue may further split (814) the request into an aligned part and a misaligned part (if it exists) as long as it is within the time-out setting, such that the aligned part would go to the data service and the misaligned part would stay at the global queue for possible merge (or until time-out).

As explained, during transit from the local queue to the global queue and from the global queue to dispatch to data services (816), the methodology checks several factors such as whether a request is aligned, request length, potential data locality and time-out settings, to achieve balanced results on throughput, alignment (so as to reduce unnecessary burden to data service) and latency (so request is dispatched at a given time period).

Figure 9:
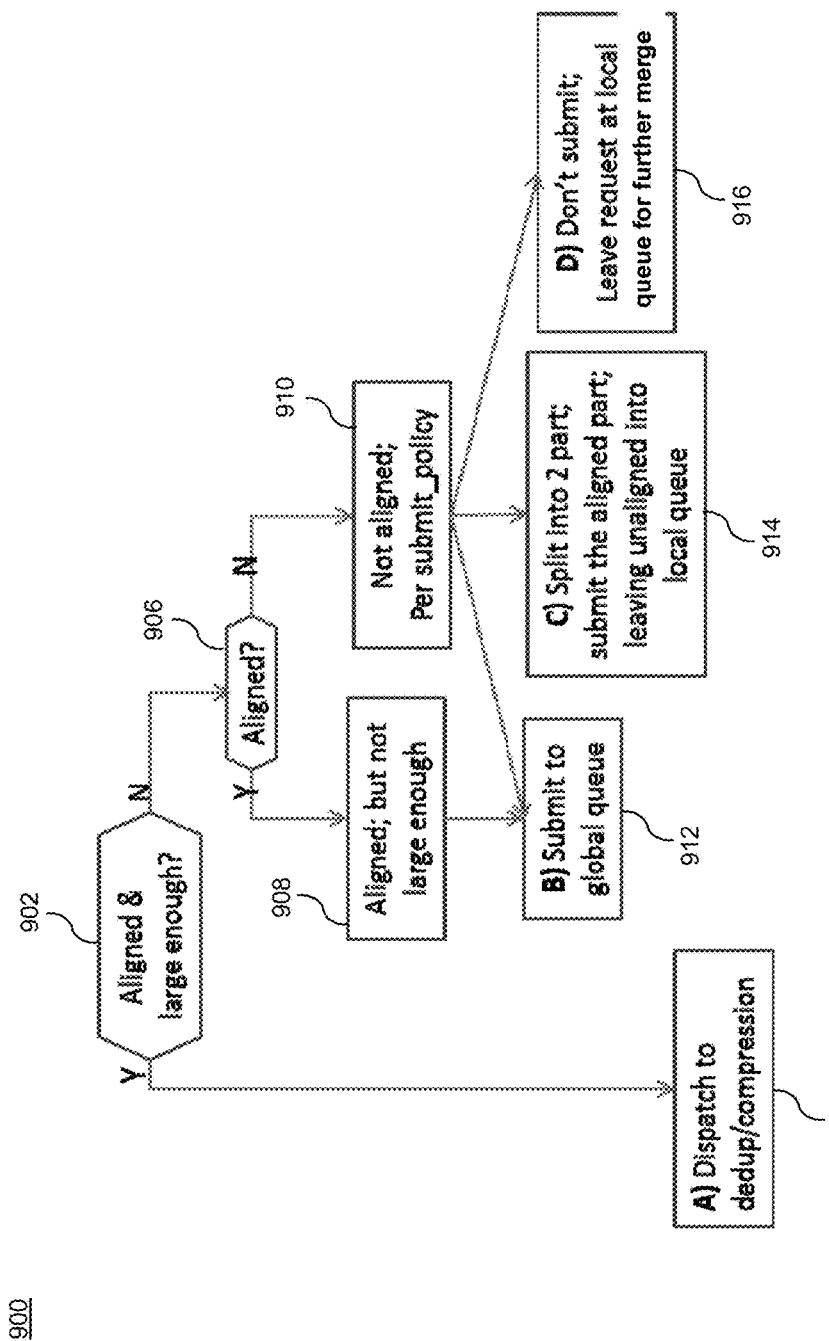
FIG. 9 illustrates a schedule enacting alignment, request length and configurable policies, according to an embodiment of the invention.

FIG. 9 illustrates a schedule 900 with considerations on alignment, request length and configurable policy, according to an embodiment of the invention. There are several cases and handling routines that may occur. Examples of these cases are shown in FIG. 9 and described below (note that the numbers below correspond to the numbers shown in FIG. 9):

A) If a request is fully aligned 902 (such as both startAddr and length are 32 KB and thus aligned if preferred size is 32 KB) and large enough (such as 32 KB*4=128 KB, 4 is setting of segment_cnt_to_dispatch), the request may skip the global queue and be submitted to deduplication/compression directly 904. Otherwise, the request is submitted to the global queue. For requests that go to the global queue, depending on aligned status and submit_policy, 3 sub-cases exist:

B) as determined in block 906, if the request is aligned 908, or not aligned but per submit_policy=global 910, submit the request to global queue 912; or C) if the request is not aligned and per submit_policy=partial, then split the request, submit the aligned part into global queue; leaving the misaligned part in local queue for continuous merge (assuming data locality at local thread) 914; or D) if per submit_policy=local, do not submit to global queue but keep it at local queue until fully merged or reach the next timeout 916. This yields an optimal data locality workload.

Note, in case C) and D) to guarantee the latency, the remaining part has the time-out setting so that a request must dispatch within up to 2 time-out periods.

To summarize, with the current situation that existing system IO schedulers are unware of data service segment requirements which causes unnecessary burdens, illustrative embodiments provide an approach that has the following exemplary advantages:

1) With a configuration module and relevant parameters, illustrative embodiments enable system IO schedulers to be aware of the segment size of deduplication/compression processes. Such a configuration can be done per device and thus is flexible.

2) With two-phase segment-aware merge/sort and scheduling, illustrative embodiments optimize for multi-core/thread environments and balance the goals of throughput, alignment and latency.

3) The approach applies to existing widely used system IO schedulers such as deadline or Noop, CFQ, which re-uses the most validated technologies.

FIG. 10 illustrates a processing platform used to implement a computing environment with a data service-aware input/output scheduler, according to an embodiment of the invention.

As an example of a processing platform on which a computing environment such as a cloud computing platform with data service-aware input/output scheduler functionalities (e.g., FIGS. 3-9) can be implemented is processing platform 1000 shown in FIG. 10. It is to be appreciated that processing platform 1000 may implement the functionalities described herein. For example, the various architectures and methodologies of FIGS. 3-9 can be implemented in processing platform 1000.

The processing platform 1000 in this embodiment comprises a plurality of processing devices, denoted 1002-1, 1002-2, 1002-3, . . . 1002-N, which communicate with one another over a network 1004. It is to be appreciated that the methodologies described herein may be executed in one such processing device 1002, or executed in a distributed manner across two or more such processing devices 1002. It is to be further appreciated that a server, a client device, a computing device or any other processing platform element may be viewed as an example of what is more generally referred to herein as a "processing device." As illustrated in FIG. 10, such a device generally comprises at least one processor and an associated memory, and implements one or more functional modules for instantiating and/or controlling features of systems and methodologies described herein.

Multiple elements or modules may be implemented by a single processing device in a given embodiment.

The processing device 1002-1 in the processing platform 1000 comprises a processor 1010 coupled to a memory 1012. The processor 1010 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 1010. Memory 1012 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 1012 may comprise electronic memory such as random access memory (RAM), read-only memory (ROM) or other types of memory, in any combination. The one or more software programs when executed by a processing device such as the processing device 1002-1 causes the device to perform functions associated with one or more of the components/steps of system/methodologies in FIGS. 3-9. One skilled in the art would be readily able to implement such software given the teachings provided herein. Other examples of processor-readable storage media embodying embodiments of the invention may include, for example, optical or magnetic disks.

Processing device 1002-1 also includes network interface circuitry 1014, which is used to interface the device with the network 1004 and other system components. Such circuitry may comprise conventional transceivers of a type well known in the art.

The other processing devices 1002 (1002-2, 1002-3, ... 1002-N) of the processing platform 1000 are assumed to be configured in a manner similar to that shown for computing device 1002-1 in the figure.

The processing platform 1000 shown in FIG. 10 may comprise additional known components such as batch processing systems, parallel processing systems, physical machines, virtual machines, virtual switches, storage volumes, etc. Again, the particular processing platform shown in this figure is presented by way of example only, and the system shown as 1000 in FIG. 10 may include additional or alternative processing platforms, as well as numerous distinct processing platforms in any combination.

Also, numerous other arrangements of servers, clients, computers, storage devices or other components are possible in processing platform 1000. Such components can communicate with other elements of the processing platform 1000 over any type of network, such as a wide area network (WAN), a local area network (LAN), a satellite network, a telephone or cable network, or various portions or combinations of these and other types of networks.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method of request scheduling in a computing environment, comprising:

obtaining a segment size for which one or more data services in the computing environment are configured to process data;

obtaining, from a host device in the computing environment, one or more requests to at least one of read data from and write data to one or more storage devices in the computing environment, wherein the one or more requests originate from one or more application threads of the host device;

aligning the one or more requests into one or more segments having the obtained segment size to generate one or more aligned segments, wherein the one or more requests are respectively provided to one or more local request queues corresponding to the one or more application threads, the one or more local request queues performing request merging, based on the obtained segment size, to generate the one or more aligned segments; and dispatching the one or more aligned segments to the one or more data services prior to sending the one or more requests to the one or more storage devices;

wherein the computing environment is implemented via one or more processing devices operatively coupled via a communication network.

2. The method of claim 1, wherein the segment size is specified by the one or more data services.

3. The method of claim 1, wherein the one or more application threads respectively execute on one or more processing cores of the host device.

4. The method of claim 1, wherein the aligning step comprises a local stage and a global stage.

5. The method of claim 4, wherein the local stage further comprises the one or more local request queues corresponding to the one or more application threads.

6. The method of claim 5, wherein the global stage further comprises a global request queue corresponding to the host device, wherein the global request queue is operatively coupled to the one or more local request queues.

7. The method of claim 6, wherein the global request queue performs request merging on the requests received from the one or more local request queues based on the obtained segment size for which the one or more data services in the computing environment are configured to process data.

8. The method of claim 6, wherein each of the one or more local request queues determine if a request is aligned and of sufficient size and, if aligned and of sufficient size, the request is dispatched to the one or more data services without being processed by the global request queue.

9. The method of claim 8, wherein if the request is aligned but not of sufficient size, the request is provided to the global request queue.

10. The method of claim 8, wherein if the request is not aligned, the local request queue splits the request into an aligned part and an unaligned part, sends the aligned part to the global request queue, and holds the unaligned part.

11. The method of claim 8, wherein if the request is not aligned, the local request queue holds the entire request.

12. The method of claim 7, wherein the global request queue splits a request into an aligned part and an unaligned part, sends the aligned part to the one or more data services, and holds the unaligned part.

13. The method of claim 7, wherein the global request queue and the one or more local request queues are responsive to a configurable parameter relating to a preferred block segment length.

14. The method of claim 7, wherein the global request queue and the one or more local request queues are responsive to a configurable parameter relating to a strategy about segment merge and submit operations.

15. The method of claim 7, wherein the global request queue and the one or more local request queues are responsive to a configurable parameter relating to a merge timeout.

16. The method of claim 7, wherein the global request queue and the one or more local request queues are responsive to configurable parameter relating to a segment length threshold.

17. The method of claim 1, wherein the one or more data services comprise one or more of inline data deduplication and inline data compression.

18. A system for request scheduling in a computing environment, the system comprising:
at least one processor, coupled to a memory, and configured to:
obtain a segment size for which one or more data services in the computing environment are configured to process data;
obtain, from a host device in the computing environment, one or more requests to at least one of read data from and write data to one or more storage devices in the computing environment, wherein the one or more requests originate from one or more application threads of the host device;
align the one or more requests into one or more segments having the obtained segment size to generate one or more aligned segments, wherein the one or more requests are respectively provided to one or more local request queues corresponding to the one or more application threads, the one or more local request queues performing request merging, based on the obtained segment size, to generate the one or more aligned segments; and
dispatch the one or more aligned segments to the one or more data services prior to sending the one or more requests to the one or more storage devices.

19. An article of manufacture for request scheduling in a computing environment, the article of manufacture comprising a non-transitory processor-readable storage medium having encoded therein executable code of one or more software programs, wherein the one or more software programs when executed by at least one processing device implement the steps of:
obtaining a segment size for which one or more data services in the computing environment are configured to process data;
obtaining, from a host device in the computing environment, one or more requests to at least one of read data from and write data to one or more storage devices in the computing environment, wherein the one or more requests originate from one or more application threads of the host device;
aligning the one or more requests into one or more segments having the obtained segment size to generate one or more aligned segments, wherein the one or more requests are respectively provided to one or more local request queues corresponding to the one or more application threads, the one or more local request queues performing request merging, based on the obtained segment size, to generate the one or more aligned segments; and
dispatching the one or more aligned segments to the one or more data services prior to sending the one or more requests to the one or more storage devices.

20. The system of claim 18, wherein:
the aligning step comprises a local stage and a global stage,
the local stage further comprises the one or more local request queues corresponding to the one or more application threads,
the global stage further comprises a global request queue corresponding to the host device, wherein the global request queue is operatively coupled to the one or more local request queues,
the global request queue is configured to perform request merging on the requests received from the one or more local request queues based on the obtained segment size,
the one or more local request queues are configured to determine if a request is aligned and of sufficient size and, if aligned and of sufficient size, to dispatch the request to the one or more data services without being processed by the global request queue,
wherein if the request is aligned but not of sufficient size, the one or more local request queues are configured to provide the request to the global request queue, and
if the request is not aligned, the one or more local request queues are configured to split the request into an aligned part and an unaligned part, to send the aligned part to the global request queue, and to hold the unaligned part.

* * * * *